United States Patent
Naim et al.

(10) Patent No.: US 11,972,362 B2
(45) Date of Patent: Apr. 30, 2024

(54) INFERRED USER INTENTION NOTIFICATIONS

(71) Applicant: Google LLC, Mountain View, CA (US)

(72) Inventors: Oren Naim, Cupertino, CA (US); Tomer Amarilio, Palo Alto, CA (US); Dennis Ai, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 980 days.

(21) Appl. No.: 16/839,712

(22) Filed: Apr. 3, 2020

(65) Prior Publication Data

US 2020/0234160 A1    Jul. 23, 2020

Related U.S. Application Data

(63) Continuation of application No. 14/668,572, filed on Mar. 25, 2015, now abandoned.

(51) Int. Cl.
*G06N 5/04* (2023.01)
*G06Q 30/02* (2023.01)

(52) U.S. Cl.
CPC ............... *G06N 5/04* (2013.01); *G06Q 30/02* (2013.01)

(58) Field of Classification Search
None
See application file for complete search history.

(56) References Cited

U.S. PATENT DOCUMENTS

| | | |
|---|---|---|
| 8,005,842 B1 | 8/2011 | Pasca et al. |
| 8,156,099 B2 | 4/2012 | Norris et al. |
| 2006/0101005 A1 | 5/2006 | Yang et al. |
| 2007/0033224 A1* | 2/2007 | Allen ..................... G06F 16/957 |
| 2008/0005095 A1 | 1/2008 | Horvitz et al. |
| 2009/0150067 A1 | 6/2009 | Lindman |
| 2009/0182597 A1 | 7/2009 | Bull et al. |

(Continued)

FOREIGN PATENT DOCUMENTS

| | | |
|---|---|---|
| CN | 1749696 A | 3/2006 |
| CN | 102368256 | 3/2012 |

(Continued)

OTHER PUBLICATIONS

China National Intellectual Property Administration; Notice of Allowance issued in Application No. 201680018194.5; 4 pages; dated Feb. 20, 2021.

(Continued)

*Primary Examiner* — Brian M Smith
(74) *Attorney, Agent, or Firm* — Gray Ice Higdon

(57) ABSTRACT

In one example, a method includes receiving, by a computing system, context information associated with a computing device; inferring, by the computing system and based on the context information, an action of a user of the computing device, the action associated with at least one entity; determining, by the computing system and based on stored attribute information associated with the at least one entity, and based on a stored set of rules associated with the inferred action, that the inferred action is not advisable; and responsive to determining that the inferred action is not advisable, outputting, by the computing system and for display on the computing device, notification data indicating that the inferred action is not advisable.

16 Claims, 10 Drawing Sheets

(56) References Cited

U.S. PATENT DOCUMENTS

| | | |
|---|---|---|
| 2009/0222438 A1 | 9/2009 | Strandell et al. |
| 2010/0168996 A1 | 7/2010 | Bourque et al. |
| 2011/0072046 A1 | 3/2011 | Chi |
| 2011/0193795 A1 | 8/2011 | Seidman et al. |
| 2011/0218883 A1 | 9/2011 | Billsus et al. |
| 2013/0110822 A1 | 5/2013 | Ikeda et al. |
| 2013/0191213 A1 | 7/2013 | Beck et al. |
| 2013/0204813 A1 | 8/2013 | Master et al. |
| 2013/0226731 A1 | 8/2013 | MacNeille et al. |
| 2014/0032678 A1 | 1/2014 | Koukoumidis et al. |
| 2014/0052718 A1 | 2/2014 | Waupotitsch et al. |
| 2014/0253319 A1 | 9/2014 | Chang |
| 2014/0278070 A1 | 9/2014 | McGavran et al. |
| 2015/0032768 A1 | 1/2015 | Miller et al. |
| 2015/0285643 A1 | 10/2015 | Tucker |
| 2016/0069699 A1 | 3/2016 | Chen et al. |
| 2016/0241997 A1 | 8/2016 | Lucas |
| 2016/0283845 A1 | 9/2016 | Amarilio et al. |

FOREIGN PATENT DOCUMENTS

| | | |
|---|---|---|
| WO | 2014018580 | 1/2014 |
| WO | 2014025705 | 2/2014 |
| WO | 2014150801 | 9/2014 |
| WO | WO2014149513 A1 | 9/2014 |
| WO | 2016153973 | 9/2016 |

OTHER PUBLICATIONS

International Preliminary Report on Patentability from International Application No. PCT/US2016/023054 dated Oct. 5, 2017. 7 Pages.

Chinese Patent Office; Office Action issued in Application No. 201680018194.5 dated Mar. 5, 2020. 29 Pages.

International Search Report and Written Opinion of International Application No. PCT/US2016/023054 dated Jun. 6, 2016. 9 Pages.

China National Intellectual Property Administration, Office Action issued in Application No. 201680018194.5, dated Oct. 23, 2020, (10 pages).

* cited by examiner

FIG. 7A

- 210
- 212 — Baby ride car seat
- 214 — Consumer Co "BabyRide" Infant Car Seat / ConsumerCo.com/... / The Consumer Co "BabyRide" Infant Car Seat ...
- 216 — Top Result: Consumer Co "BabyRide" Infant Car Seat

ALERT

There is a product recall on the Consumer Co "BabyRide" Infant Car Seat

For more details go to www.cpsc.gov/Recalls/...

- Online Baby: Best Selection of... / OnlineBaby.com/... / We have the best selection of rear and front facing car se...
- 2014 Mom's Picks: Best infant car seats / Momsknowbest.com/... / See a slide show of our favorite rear-facing infant car seats...

FIG. 7B

- 220
- 222 — Lord of the Rings
- 224 — Lord of the Rings — Movie Series
- 226 — Movie: Lord of the Rings: The Fellowship of the Ring

This movie is available for free on MovieSite.com www.MovieSite.com/signin/...

- Lord of the Rings: The Fellowship of... / www.imdb.com/title... / Directed by...
- Lord of the Rings: The Two Towers... / www.imdb.com/title... / Directed by...
- Lord of the Rings: by J.R.R. Tolkien / www.bookinfo.com/... / Information on Books written by J.R.R. Tolkien ...

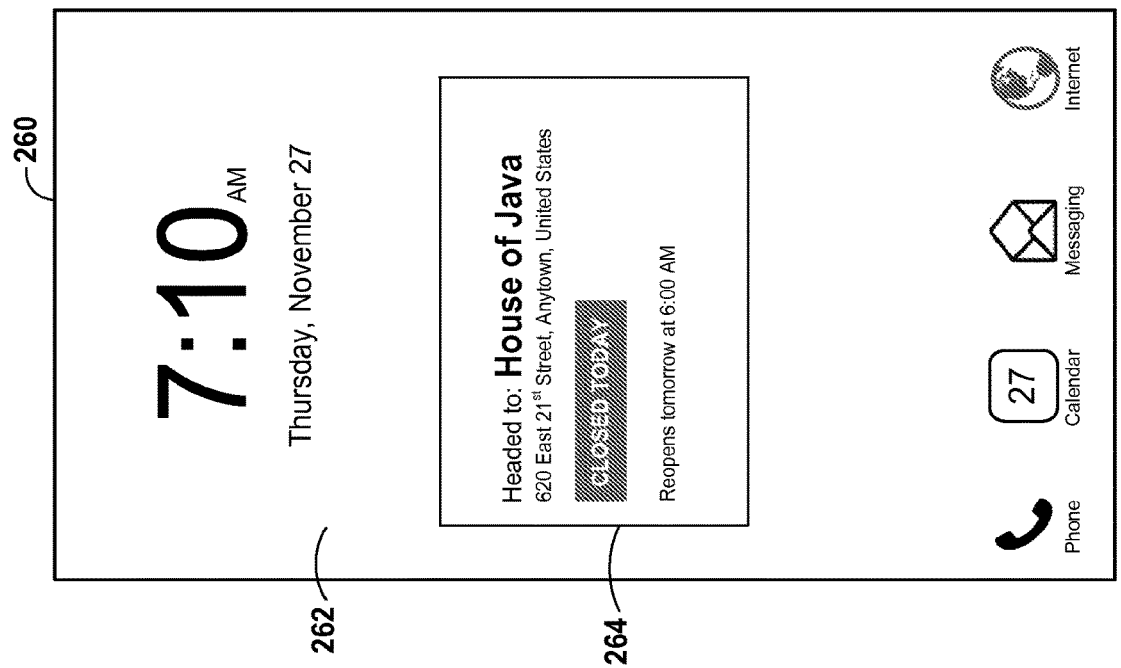

INFERRED USER INTENTION NOTIFICATIONS

BACKGROUND

As a result of their rapidly increasing mobility and capabilities, mobile computing devices, such as smartphones, personal digital assistants (PDAs) and tablet computers, are being used by consumers to accomplish a wide variety of tasks. For example, mobile computing devices may be used to transmit information over the internet, communicate with other devices, browse the internet, purchase goods and services, listen to music, watch movies, and provide information on how to navigate from one point to another, to name a few. Such devices may also be used as alarm clocks and/or as personal assistants that remind their users of upcoming meetings and other events. At times, a person may use their device to help them accomplish a real-world task, such as navigating to a place of business, only to find out after the fact that the task cannot be completed in the manner desired. For example, after getting in their car and following a route suggested by their computing device, the user may discover that the business is closed.

SUMMARY

In one example, a method includes receiving, by a computing system, context information associated with a computing device, inferring, by the computing system and based on the context information, an intention of a user of the computing device, the intention associated with an entity, determining, by the computing system and based on stored attribute information associated with the entity, and based on a stored set of rules associated with the inferred intention, that the inferred intention is not advisable, and responsive to determining that the inferred intention is not advisable, outputting, by the computing system and for display on the computing device, notification data indicating that the inferred intention is not advisable.

In another example, the disclosure is directed to a computing system comprising one or more processors, at least one module executable by the one or more processors to receive context information associated with a user computing device, infer, based on the context information, an intention of a user of the user computing device, the intention associated with at least one entity, determine, based on stored attribute information associated with the at least one entity, and based on a stored set of rules associated with the inferred intention, that the inferred intention is not advisable, and responsive to determining that the inferred intention is not advisable, output, for display on the user computing device, notification data indicating that the inferred intention is not advisable.

The inferred intention may be one of a plurality of stored intentions, and each of the plurality of stored intentions may be associated with a different stored set of rules. Each rule in the stored set of rules may define an operation by which advisability of the inferred intention may be evaluated with respect to the stored attribute information. The stored set of rules may include comparing a current time with an hours of operation attribute associated with the entity. The context information may include at least one of location data associated with the computing device, a motion of the user, a biometric parameter associated with the user, weather data, an online interaction associated with the user, an image, a sound, a search query, and a navigation query. The context information may be based on information received from an application of the computing device. The entity may be a place of business, and determining that the inferred intention is not advisable may include comparing a current time to an hours of operation attribute associated with the entity. The entity may be a place of business, the inferred intention of the user may be to place a telephone call to the place of business, and the notification may indicate that the place of business is not currently open for business. The entity may be a place of business, the inferred intention of the user may be to travel to the place of business, and the notification may indicate that the place of business is not currently open for business. The context information may include a search query, and the intention of the user may be inferred based on one or more terms of the search query.

The details of one or more examples of the disclosure are set forth in the accompanying drawings and the description below. Other features and advantages will be apparent from the description and drawings, and from the claims.

BRIEF DESCRIPTION OF DRAWINGS

FIGS. 7A, 7B, 7C, 7D, 7E, 7F, and 7G are diagrams illustrating example notifications about inferred intention of a user as displayed on a user interface of a computing device in accordance with one or more aspects of the present disclosure.

DETAILED DESCRIPTION

Figure 1A:
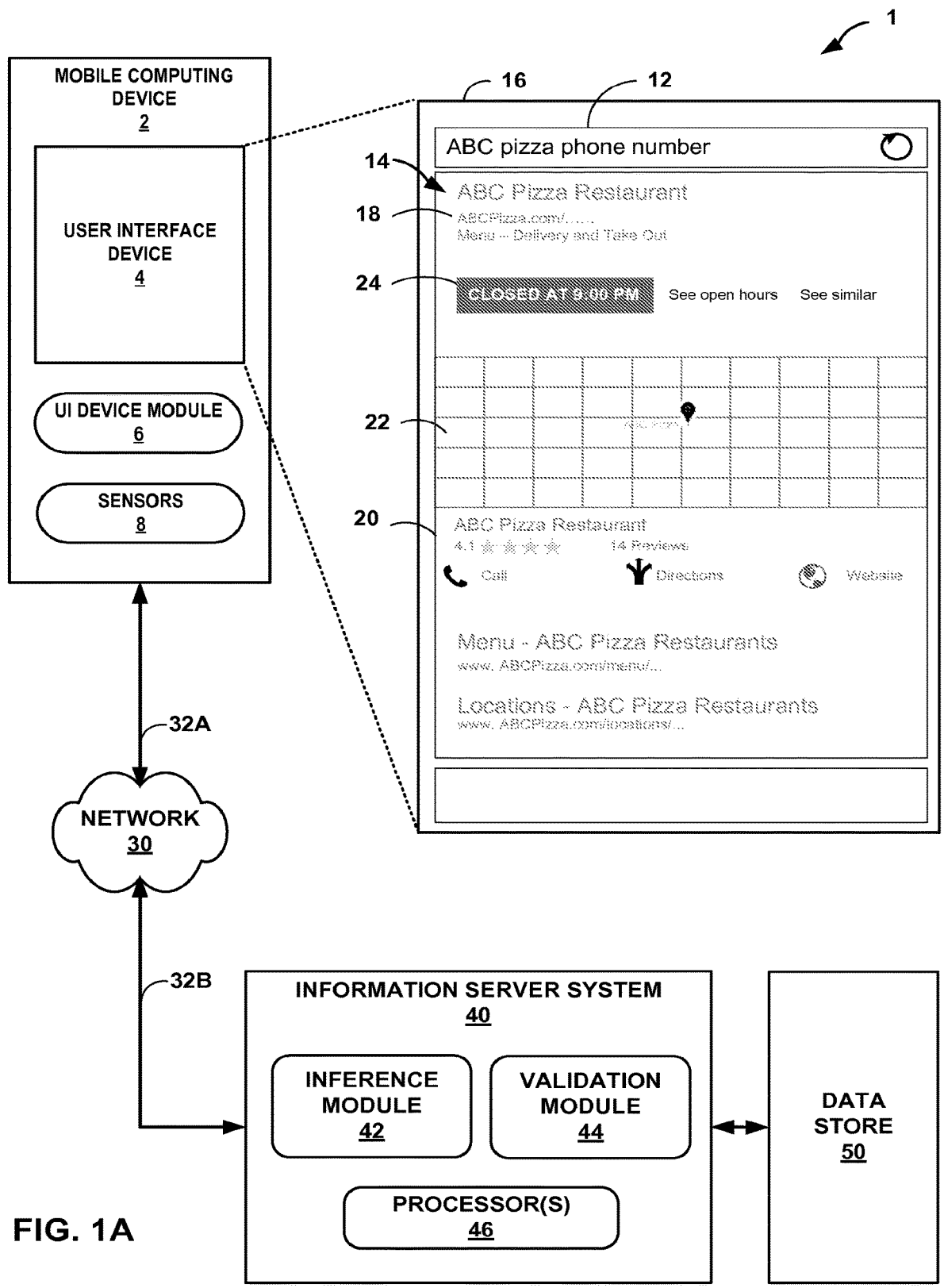
FIGS. 1A and 1B are block diagrams illustrating example computing systems configured to generate inferred user intention notifications in accordance with one or more aspects of the present disclosure.

In general, aspects of the disclosure are directed to techniques for inferring an intention of a user and selectively generating notifications about the inferred intention. For example, a computing system may infer the intention of the user based on context information received from a computing device, such as a mobile computing device (smartphone, wearable device, etc.) associated with the user. The computing system may then determine whether the inferred intention of the user is advisable. For example, if the inferred intention of the user is to travel to a place of business and the place of business is currently closed, the computing system may determine that the inferred intention of the user is not advisable, and cause a notification to be displayed on the user's computing device that the business is closed or will be closed by the time the user arrives. As another example, if the inferred intention of the user is to purchase a particular product, and there is a current recall on the product, the computing system may determine that the inferred intention of the user is not advisable, and cause a notification to be displayed on the user's computing device regarding the product recall. As another example, if the inferred intention of the user is to purchase an airline ticket to a particular country and there is currently a travel alert for that country, the computing system may determine that the inferred intention of the user is not advisable, and cause a notification to be displayed on the user's computing device regarding the travel advisory.

To determine the advisability of the inferred intention of the user, the computing system also identifies one or more entities associated with the inferred intention of the user. The computing system stores a list of entities, and each entity is characterized by a set of attributes that define or describe the entity. The computing system further stores a list of intentions. Each intention is associated with a set of rules defining operations by which advisability of the associated intention may be evaluated with respect to the stored entity and attribute information. For example, if the inferred intention is to travel to a place of business, a rule may include comparing the current time to an hours of operation attribute associated with the place of business. As another example, if the inferred intention is to travel to a place of business, a rule may include comparing the current time to hours of operation attributes associated with other places providing that type of business, and provide alerts based on the hours of operation associated with the other places of business. As another example, if the inferred intention is to purchase a particular product, a rule may include checking a recall status attribute associated with the product. As another example, if the inferred intention is to purchase an airline ticket to a particular country, a rule may include checking a travel alert attribute associated with the country.

If, based on the set of rules associated with the inferred intention of the user, the computing system determines that the inferred intention of the user is not advisable, and/or that an alternative course of action is preferable based on some criteria, the computing system may output notification data indicating that the action is not advisable or suggesting the alternative course of action for display on the user's computing device.

Throughout the disclosure, examples are described in which a computing device and/or a computing system may analyze information (e.g., locations, speeds, and any other context information, etc.) associated with a computing device only if the computing device receives permission from the user to analyze the information. For example, in situations discussed below in which the computing device may collect or may make use of information associated with the user or with the computing device, the user may be provided with an opportunity to provide input to control whether programs or features of the computing device can collect and make use of the information (e.g., information about a user's current location, current speed, etc.), or to dictate whether and/or how to the computing device may receive content that may be relevant to the user or the user's computing device. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or the computing system.

FIG. 1A is a conceptual diagram illustrating an example computing system 1 configured to generate inferred user intention notifications in accordance with one or more aspects of the present disclosure. System 1 includes one or more computing devices, such as computing device 2, and an information server system 40. The one or more computing devices communicate with information server system 40 using one or more networks 30. Information server system 40 may also communicate with a database 50. Examples of computing device 2 may include, but are not limited to, portable or mobile devices such as mobile phones (including smartphones), laptop computers, tablet computers, wearable computing devices such as smart watches or computerized eyewear, smart television platforms, cameras, personal digital assistants (PDAs), systems embedded in vehicles, as well as interconnected computing devices, such as a smartphones communicatively coupled for display of alerts and like to a wearable computing device or vehicle-embedded system, etc. In some examples, computing device 2 may include stationary computing devices such as desktop computers, servers, mainframes, etc.

Network 30 represents any public or private communication network, for instance, a cellular, Wi-Fi, and/or other type of network for transmitting data between computing devices. Computing device 2 and information server system 40 may send and receive data across network 30 using any suitable communication techniques. For example, computing device 2 may be operatively coupled to network 30 using network link 32A. Information server system 40 may be operatively coupled to network 30 by network link 32B. Network 30 may include network hubs, network switches, network routers, etc., that are operatively inter-coupled to provide for the exchange of information between computing device 10 and information server system 40. In some examples, network links 32A and 32B may be Ethernet, ATM or other network connections. Such connections may be wireless and/or wired connections. Information server system 40 represents any suitable remote computing system, such as one or more desktop computers, laptop computers, mainframes, servers, cloud computing systems, etc. capable of sending and receiving information across network link 32B to network 30.

Information server system 40 may generate notifications about inferred intention of a user based on context information associated with one or more computing devices, such as computing device 2, and send the notifications to at least one of the one or more computing devices. The notification may indicate whether the inferred intention of the user is advisable. For example, if the inferred intention of the user is to call or travel to a place of business and the place of business is currently closed, information server system 40 may determine that the inferred intention is not advisable. Accordingly, information server system 40 may output notification data indicating that the inferred intention is not advisable and send the notification data to computing device 2. Upon receipt of the notification data, computing device 2 may display the notification data, via user interface 4 for example, indicating that the inferred intention is not advisable. The notification data may include additional information to be displayed, such as a reason why the inferred intention is not advisable (e.g., the business is currently closed or will close prior to the user arriving at the business), a link to further information, or other information that may be relevant to the notification.

In the example of FIG. 1A, information server system 40 includes an inference module 42 and a validation module 44. Inference module 42 may infer intention of a user of a computing device, such as computing device 2, based on context information associated with computing device 2. Inference module 42 and validation module 44 may perform operations described using software, hardware, firmware, or a mixture of hardware, software, and firmware residing in and/or executing at information server system 40. Information server system 40 may execute inference module 42 and validation module 44 with multiple processors (e.g., processors 46) or multiple devices. Information server system 40 may execute inference module 42 and validation module 44 as a virtual machine executing on underlying hardware. Inference module 42 and validation module 44 may execute as a service of an operating system or computing platform. Inference module 42 and validation module 44 may execute as one or more executable programs at an application layer of a computing platform.

Inference module 42 and/or validation module 44 may send notification data to one or more computing devices, such as computing device 2, over network 30. For example, inference module 42 may receive context information associated with one or more computing devices, such as computing device 2. Inference module 42 may infer an intention of a user of computing device 2 based on the received context information. Validation module 44 may receive the context information and may also receive inference data indicative of the inferred intention of the user from inference module 42. Validation module 44 may generate a notification for transmission to computing device 2 about the inferred intention of the user.

Computing device 2, in some examples, may include user interface (UI) device 4, a UI device module 6, and sensors 8. Other examples of computing device 2 that implement aspects of this disclosure may include additional components not shown in FIG. 1A. In some examples, computing device 2 may be associated with a user that may interact with the computing device by providing various user inputs into the computing device.

Sensors 8 may include, for example, one or more motion sensors, location sensors, a user interface, a presence-sensitive display, microphones, cameras, biometric sensors, and/or any other type of sensors by which a computing device may receive context information. Sensors 8 may sense context information associated with computing device 2. The context information may include, for example, location data associated with the computing device, motion data associated with the computing device, a biometric parameter associated with a user of the computing device, weather data, image data, proximity to another device such as another user's mobile device, or a sound. As another example, the context information may include information input into computing device 2 with respect to a request or query, such as a search query, a navigation query, or other online interaction of the user. The context information may also include information associated with interactions with one or more applications of computing device 2, such as calendar applications, alarm applications, mapping applications, camera applications, or any other application interactions. The context information may also include repeated actions that a user performs on the computing device or sensed by the computing device (e.g., common locations, repeated calendar appointments, repeated search queries, etc.).

In situations in which the systems and/or devices discussed herein may collect personal information about the user, or may make use of the user's personal information, the user may be provided with an opportunity to control whether, and to what extent, programs or features collect the user's information (e.g., information about the user's social network, social actions or activities, profession, the user's preferences, or the user's current location, biometric information about the user, and other types of context information that may be collected). In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how context information is collected about the user and used by a computer server system or computing device.

As shown in FIG. 1A, computing device 2 may further include user interface device 4 and user interface (UI) device module 6. User interface device 4 may include, for example, a presence-sensitive display that may display a graphical user interface and receive input using capacitive, inductive, and/or optical detection at or near the presence-sensitive display. User interface device 4 may also include any other type of user interface device capable of interacting with a user.

UI device module 6 may cause user interface device 4 to output a user interface, such as example user interface 16, for display. UI device module 6 may also interpret inputs detected at user interface device 4. For example, UI device module 6 may interpret gestures provided by a user on a presence-sensitive display; inputs into a keyboard displayed on a presence-sensitive display, etc. UI device module 6 may relay information about the inputs detected at user interface device 4 to one or more associated platforms, operating systems, applications, and/or services executing at computing device 2.

UI device module 6 may also receive information and instructions from one or more associated platforms, operating systems, applications, and/or services executing at computing device 2 for generating user interface 16. In addition, UI module 6 may act as an intermediary between the one or more associated platforms, operating systems, applications, and/or services executing at computing device 2 and various output devices of computing device 2 (e.g., speakers, LED indicators, vibrators, etc.) to produce output (e.g., graphical, audible, tactile, etc.) with computing device 2.

As used throughout the disclosure, the term "inferred intention" is used to describe inferred intention or predicted actions of a user (referred to generally as "inferred intention") based on context information received from one or more computing devices associated with the user. The inferred intention may include, for example, an inferred or predicted action of the user. As one example, the context information may include a structured request, such as a search query input by the user into an application of the computing device. The application may include an internet browser, a mapping application, a calendar application, or other application of the computing device. The search query may include one or more terms, which, in this example, form the context information. Inference module 42 may infer an intention of the user based on the one or more terms of the search query. For example, a user may input a request for a phone number of a place of business into a search engine or web browser application on the computing device. Inference module 42 may infer the intention or intended action of the user based on the terms of the search query (i.e., "phone number" and "name of business"). In this example, the inferred intention may be that the user intends to call the place the business.

As shown in FIG. 1A, for example, a user has input the search query "ABC pizza phone number" into a search query box 12 of an application on computing device 2. The search results are displayed on a search results page 14 on user interface 16. The search results page 14 generally includes a listing of results returned by the application in response to the search query "ABC pizza phone number." The search results may also include links to images, videos, news, maps, sponsored listings, or other content. In the example of FIG. 1A, search results page 14 includes a link 18 to a website of an ABC Pizza Restaurant, a map 22 for an ABC Pizza Restaurant, and direct links 20 to more detailed information associated with an ABC Pizza Restaurant such as ratings, reviews, directions, a phone number, and a website.

User interface 16 also includes a notification 24. In this example, notification 24 is a visually displayed graphical user interface element that includes the text "CLOSED AT 9:00 PM." It shall be understood that example notification 24 is described herein for illustrative purposes only, and that the notifications of the present disclosure may include any combination of text, images, hyperlinks, or other visually displayable information. The notifications may further be accompanied by one or more sounds, vibrations, or other sensory outputs associated with the notification. In other examples, the notification may be a voice message output from a speaker or other auditory output device.

In general, as will be explained in further detail below, inference module 42 extracts an inferred intention based on the context information. The inferred intention generally includes an inferred "intention" or action of the user and an "entity" or object associated with the intention. In the example of FIG. 1A, the context information is the search query "ABC Pizza phone number." Based on this context information, inference module 42 infers that the "intention" of the user is to "call" a place of business having the "entity" name "ABC Pizza." In other words:
    <intention>: call
    <entity>: ABC Pizza In some examples, there may be more than one entity associated with the intention. For example, if there is more than one ABC Pizza location, each individual location may be considered a separate entity.

Validation module 44 receives the inferred intention of the user (including both the intention and the one or more entities) as determined by inference module 42, and determines whether or not the inferred intention of the user is advisable. In general, as will be explained in further detail below, a list of one or more defined intentions are stored in a data store, such as data store 50 as shown in FIG. 1A. Each intention is associated with a set of rules for evaluating the advisability of the intention. For example, a rule associated with the intention "call" may include:
    <intention>: call
    <rule>: compare current time vs. operating hours of <entity>.

Other user intentions may include, for example, "visit," "purchase," "navigate to," etc., or any other intention of a user for which notifications about the advisability of the inferred intention may be beneficial.

Validation module 44 thus may compare the current time with the operating hours of entity ABC Pizza. In this example, validation module 44 has determined that a nearby ABC Pizza is currently closed. Validation module 44 then outputs notification data to that effect and communicates the notification data to computing device 2.

Responsive to receiving the notification data from validation module 44, computing device 2 may display the notification data as a graphical notification on user interface 16. In this example, the resulting notification 24 includes the text banner "CLOSED AT 9:00 PM." The notification may also include a link to further information that may be relevant to the notification. In this example, notification 24 includes a link with the text "See open hours." If the user is interested, the user may click on the link to view the hours of operation of the ABC Pizza Restaurant. In addition, alternative information relevant to the notification may also be presented. Alternative information can include a selection to initiate a search for similar, alternative businesses that may be open and nearby, such as "Suggest similar" link as shown in notification 24 of FIG. 1A. This alternative information may also include a list of such alternative destinations (for example obtained from a search based on a query re-write, in response to determining that the target business is not currently open). It will be appreciated that operating hours are but one example of information that may be used to alert a user to consider changing a current course of action, and such an example shall not by itself limit the scope of the present disclosure.

In the example of FIG. 1A, notification 24 is displayed near the top of the search results page 14. The visual appearance of search results page 14 may also be grayed out or otherwise altered so as to visually recede to further increase the visibility of notification 24. In another example, the notification 24 may be displayed by itself without search results page 14 in the background to further increase the visibility of notification 24. The computing device may alter the visual appearance of notification 24 or the previously displayed search results page 14 in other ways to increase the visibility of the notification and therefore better catch the attention of the user of computing device 2. For example, notification 24 may have a different size, a different visual style, a different foreground and/or background color, a different opacity/translucency, a different icon style, a different font size and/or font style, and the like compared to the other user interface elements 18, 20, 22, etc. display on user interface 16.

The user, upon viewing the notification 24 "CLOSED AT 9:00 PM," may decide on a course of action based on the contents of the notification. For example, assuming that the inferred intention to call the nearby ABC Pizza Restaurant was correct, the user may decide not to call ABC Pizza Restaurant, and may instead search for another nearby pizza restaurant. As another example, the user may decide to call the ABC Pizza Restaurant despite the contents of the notification. As another example, the user may decide not to drive to any the nearby ABC Pizza Restaurant based on the information that they are currently closed presented in notification 24.

In some examples, a user may interact with notification 24 to cause user interface 16 to present additional information associated with the notification. For example, notification 24 may include a user interface element that the user may interact with to cause user interface 16 to present additional information associated with the notification, such as the hours of operation of the place of business, a link to the website of the business, a link to specific information about the business (such as the "See open hours" link discussed above), and the like. If user interface 16 includes a presence-sensitive display, the user may interact with user interface elements associated with notification 24 by tapping, dragging, or performing any other suitable touch gesture at the region of the presence-sensitive display that corresponds to that user interface element.

Figure 1B:
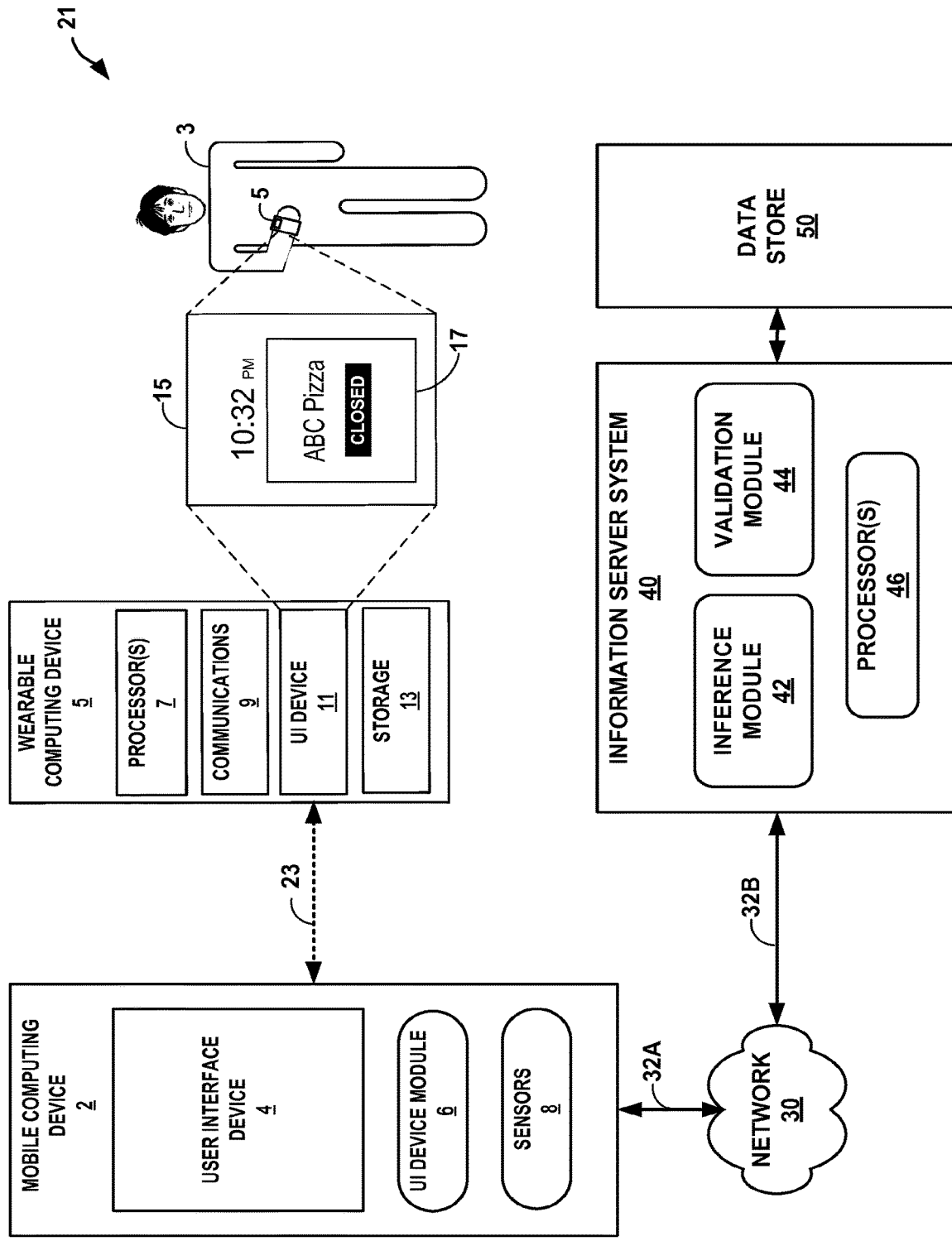

FIG. 1B is a block diagram illustrating another example computing system 21 configured to generate inferred user intention notifications in accordance with one or more aspects of the present disclosure. As shown in the example of FIG. 1B, the system 21 includes mobile computing device 2, network 30 and information server system 40 as shown and described above with respect to FIG. 1A. System 21 further includes a wearable computing device 5. Examples of wearable computing device 20 may include, but are not limited to, smart watches, smart glasses, headsets, mobile phones (including smartphones), tablet computers, cameras, personal digital assistants (PDAs), etc. In some examples, mobile computing device 2 may be located in a bag or a pocket of a user 3 and wearable computing device 5 may be worn on the user's wrist.

In the example of FIG. 1B, wearable computing device 5 includes one or more processor(s) 7, a communications module 9, a user interface (UI) device 11, and one or more storage devices 13. One or more storage devices 13 may be configured to store information within wearable computing device 5 during operation. Storage devices 13 may include, for example, a computer-readable storage medium or computer-readable storage device. One or more processors 7 may be configured to implement functionality and/or process instructions for execution within wearable computing device 5. For example, processor(s) 7 may be capable of processing instructions stored by storage device(s) 13. Examples of one or more processors 7 may include, any one or more of a microprocessor, a controller, a digital signal processor (DSP), an application specific integrated circuit (ASIC), a field-programmable gate array (FPGA), or equivalent discrete or integrated logic circuitry.

A user 3 associated with wearable computing device 5 may interact with wearable computing device 5 by providing various user inputs to the wearable computing device 5, e.g., using the at least one UI device 11. In some examples, the at least one UI device 11 is configured to receive tactile, audio, or visual input. In addition to receiving input from a user, UI device 11 can be configured to output content such as a graphical user interface (GUI) for display. In some examples, UI device 11 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. In other examples, the display device can be physically separate from a presence-sensitive device included in wearable computing device 5.

Communication module 9 may manage communications between wearable computing device 5 and other computing devices, such as mobile computing device 2, information server system 40, or any other computing system or device. For instance, communication module 9 of wearable computing device 5 may exchange information with mobile computing device 2 using a form of wireless communication (indicated generally by reference numeral 23), such as Bluetooth, Near-Filed Communication (NFC), Wi-Fi, etc. As another example, communication module 9 may receive indications of user input detected by wearable computing device and communicate those to mobile computing device 2. For example, user information input into wearable computing device 5 may be transmitted to mobile computing device 2 and be processed in system 21 as context information from which a user intention may be inferred.

In addition to displaying notifications on a display of mobile computing device 2, as shown in FIG. 1A, notification data output by validation module 44 about the inferred user intention may be communicated from mobile computing device 2 for display on UI device 11 of wearable computing device 5, as shown in FIG. 1B. In this example, a display 15 of wearable computing device 5 includes a notification 17. In this example, notification 17 includes the text "ABC Pizza" and a banner containing the word "CLOSED." Notification 17 may further include additional information to be displayed, such as a reason why the inferred intention is not advisable, a link to further information, or other information that may be relevant to the notification.

In this example, the amount of information displayed in notification 17 may be relatively less than the amount of information displayed in notification 24 of FIG. 1A, due at least in part to the relatively smaller size of the display 15 on wearable computing device 5 as compared to the display 16 on mobile computing device 2. In other words, the notification data output by validation module 44 may be displayed in different ways depending upon the device on which the notification is presented. The notifications about the inferred user intention may be displayed on one or both of the mobile computing device 2 and/or wearable computing device 5. For example, user 3 may configure mobile computing device 2 and/or wearable computing device 5 according to their notification preference, or the display preferences may be automatically determined.

Figure 2:
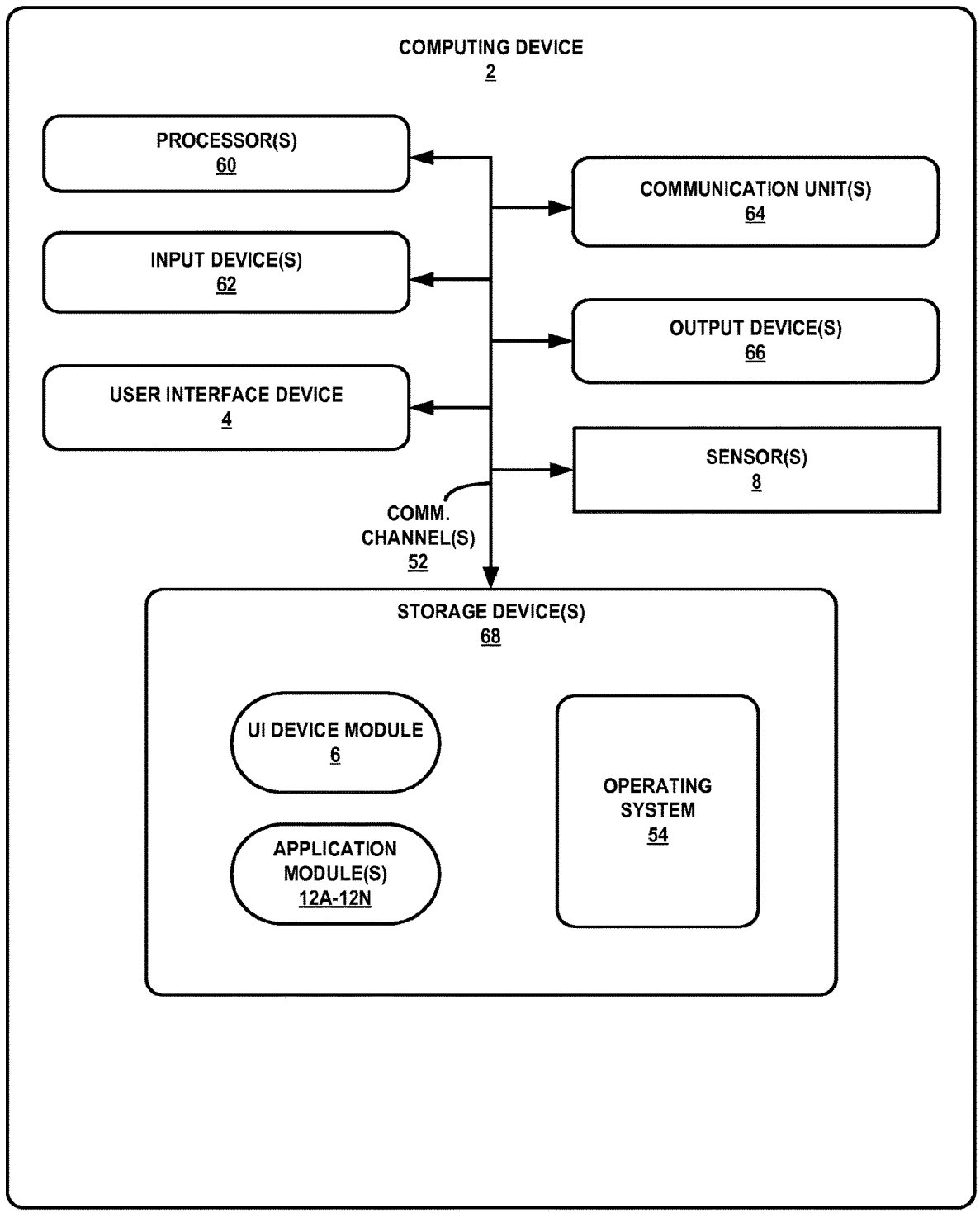
FIG. 2 is a block diagram illustrating an example computing device configured to present notifications in accordance with one or more aspects of the present disclosure.

FIG. 2 is a block diagram illustrating an example computing device 2 configured to display notifications about inferred intention of a user in accordance with one or more aspects of the present disclosure. Computing device 2 of FIG. 2 is described below within the context of computing device 2 of FIGS. 1A and 1B. FIG. 2 illustrates only one particular example of computing device 2 of system 1, and many other examples of computing device 2 may be used in other instances and may include a subset of the components included in example computing device 2 or may include additional components not shown in FIG. 2.

As shown in the example of FIG. 2, computing device 2 includes user interface device 4, one or more processors 60, one or more input devices 62, one or more communication units 64, one or more output devices 66, and one or more storage devices 68. Storage devices 68 of computing device 2 also include UI module 6, application modules 12A-12N ("application modules 12"), and operating system 54. Communication channels 52 may interconnect each of the components 4, 6, 8, 12, 60, 62, 64, 66, 68, and 54 for inter-component communications (physically, communicatively, and/or operatively). In some examples, communication channels 52 may include a system bus, a network connection, an inter-process communication data structure, or any other method for communicating data.

One or more input devices 62 of computing device 2 may receive input. Examples of input are tactile, audio, and video input. Input devices 62 of computing device 2, may include, for example, a presence-sensitive display, touch-sensitive screen, mouse, keyboard, voice responsive system, video camera, microphone or any other type of device for detecting input from a human or machine.

One or more output devices 66 of computing device 2 may generate output. Examples of output are tactile, audio, and video output. Output devices 66 of computing device 2, may include, for example, a presence-sensitive display, sound card, video graphics adapter card, speaker, cathode ray tube (CRT) monitor, liquid crystal display (LCD), or any other type of device for generating output to a human or machine.

One or more communication units 64 of computing device 2 may communicate with external devices via one or more networks by transmitting and/or receiving network signals on the one or more networks. For example, computing device 2 may use communication unit 64 to send and receive data to and from information server system 40 of FIG. 1A. Computing device 2 may use communication unit 64 to transmit and/or receive radio signals on a radio network such as a cellular radio network. Likewise, communication units 64 may transmit and/or receive satellite signals on a satellite network such as a global positioning system (GPS) network. Examples of communication unit 64 include a network interface card (e.g. such as an Ethernet card), an optical transceiver, a radio frequency transceiver, a GPS receiver, or any other type of device that can send and/or receive information. Other examples of communication units 64 may include short wave radios, cellular data radios, wireless Ethernet network radios, as well as universal serial bus (USB) controllers.

In some examples, UID 4 of computing device 2 may include functionality of input devices 62 and/or output devices 66. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x, y) coordinate) of a screen at which the object was detected. In another example range, a presence-sensitive input device may detect an object six inches or less from the screen and other ranges are also possible. The presence-sensitive input device may determine the location of the screen selected by an object using capacitive, inductive, and/or optical recognition techniques. In some examples, presence sensitive input device also provides output to a user using tactile, audio, or video stimuli as described with respect to output device 66, e.g., at a display. In the example of FIG. 2, UID 4 presents a user interface (such as user interface 16 of FIG. 1A).

While illustrated as an internal component of computing device 2, UID 4 also represents and external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more storage devices 68 within computing device 2 may store information for processing during operation of computing device 2 (e.g., computing device 2 may store data accessed by user interface device module 6 and applications 12 during execution at computing device 2). In some examples, storage device 68 may include temporary memory, meaning that a primary purpose of storage device 68 is not long-term storage. Storage devices 68 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 68 may also include one or more computer-readable storage media. Storage devices 68 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EE-PROM) memories. Storage devices 68 may store program instructions and/or data associated with user interface device module 6 and/or application modules 12.

One or more processors 60 may implement functionality and/or execute instructions within computing device 2. For example, processors 60 on computing device 2 may receive and execute instructions stored by storage devices 68 that execute the functionality of UI device module 6, application modules 12, and operating system 54. The instructions executed by processors 60 may cause computing device 2 to generate, retrieve, and/or store information within storage devices 68 during program execution. Processors 60 may execute instructions of modules 6 and 12 to cause UI device 4 to present graphical user interface 16. That is, modules 6 and 12 may be operable by processors 60 to perform various actions or functions of computing device 2 as described in this application.

Computing device 2 may be part of a mobile communications network. Computing device 2 may exchange data with a server or cloud computing system over the mobile communications network via one or more communication units 64. The server or cloud computing system may perform some or all of the operations related to modules 6 and 12 described herein. In other words, some or all of the operations related to modules 6 and 12 can be implemented locally at computing device 2, for instance, a mobile phone, and some or all of the operations may be performed remotely via a server connected to the mobile communications network that exchanges data with computing device 2. In other words, while shown in FIG. 2 as being included within computing device 2, modules 6 and 12 may be a part of a remote computing system and may execute as one or more remote computing services, such as one or more services provided by a cloud and/or cluster based computing system.

Operating system 54 may execute to cause computing device 2 to perform various functions to manage hardware resources of computing device 2 and to provide various common services for other computer programs. Application modules 12 may cause computing device 2 to provide various applications (e.g., "apps") through which users may perform various tasks using computing device 2.

Computing device 2 of FIG. 2 also includes one or more sensors 8 that detect context information associated with computing device 2. As discussed above, sensors 8 may include, for example, a motion sensor, a location sensor, a microphone, a camera, a biometric sensor, and/or any other type of sensor by which a computing device may receive context information. As described herein, context information may also be detected using other sensors such as input devices 62 or user interface device 4, such as a presence-sensitive display, or any other type of user interface.

Communication units 64 of computing device 2 transmit the context information to information server system 40 using networks 30. Communication units 64 of computing device 2 further receive notification data from information server system 40, and displays a corresponding notification on the user interface device 4 or output device 66. The notification may include any combination of text, images, hyperlinks, or other visually displayable information. The notifications may further be accompanied by one or more sounds, vibrations, or other sensory outputs associated with the notification. In other examples, the notification may be a voice message output from a speaker or other auditory output device.

As described above, the context information may include a search query. A search query is a collection of one or more constraints (e.g., keywords) that identify a subset of a larger collection of information for retrieval. For example, a search query can include a string of text that is provided to a search engine by a human user for searching the Internet for resources that are related to the text in the search query. The context information may further include a combination of one or more types of data, such as a search query in combination with motion or location data of the device.

To extract the <intention> and the one or more <entities> from the context information, inference module 42 may analyze a search query to identify the <intention> and the <entities> or "objects" of the search. Entities may include specific instances (e.g., "ABC Pizza," "Acme Football Team," "France") or categories (companies, music, pharmaceuticals). Each entity may be characterized by "attributes" that in some way further define or describe the entity. For example, an attribute may include properties, features, or characteristics of the entity. In the case of entity "France," for example, the attributes may include "capital," "population," and "currency" attributes. In the case of entity "company," for example, the attributes may include "CEO," "revenue," "market," and "website" attributes.

Figure 3:
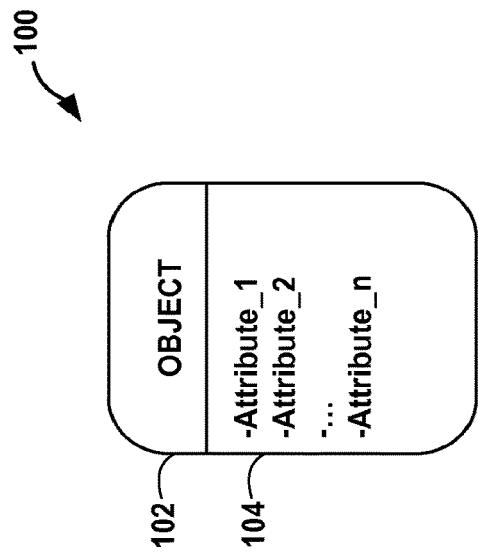
FIG. 3 is an example of a data object that represents an entity and attributes of the entity.

FIG. 3 is an example of a data object 100 that represents an entity and attributes associated with the entity. Data object 100 can represent an instance (e.g., ABC Pizza, Acme Football Team, France) or a category of instances (e.g., companies, music, pharmaceuticals). In some implementations, multiple data objects can be used to define a system of entities using relationships between entities, attribute inheritance, and the like.

The representation of an entity by data object 100 may include an object name 102 and a set of entity attributes 104. Object name 102 is the name of the entity represented by object 100. Attributes 102 include attributes that are properties, features, or characteristics of the entity represented by object 100.

Figure 4:
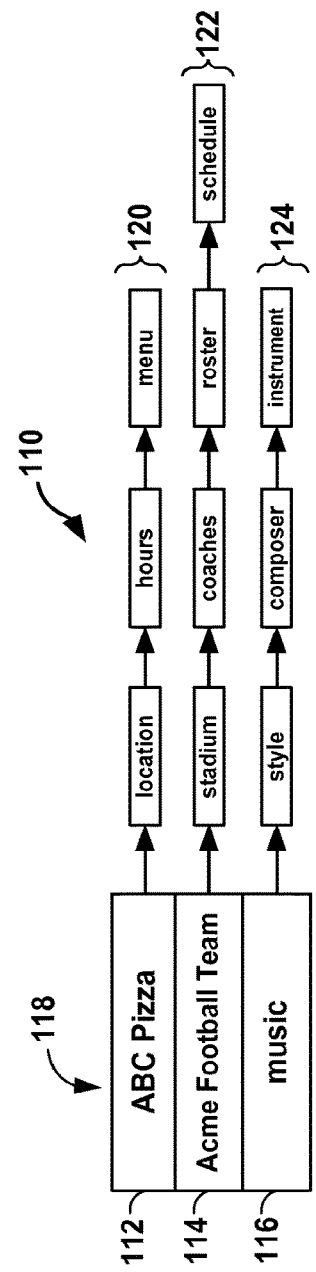
FIG. 4 is a conceptual diagram illustrating a list of entities and sets of attributes associated with the entities.

FIG. 4 is a conceptual diagram 110 illustrating the association of entities with sets of attributes. Diagram 110 includes a list 118 that includes entries 112, 114, 116. Entries 112, 114, 116 each include an entity identifier and an associated set of attributes 120, 122, 124, respectively. In particular, entry 112 includes an identifier of the entity "ABC Pizza" associated with a set of attributes 120; entry 114 includes an identifier of the entity "Acme Football Team" associated with a set of attributes 122; and entry 116 includes an identifier of the entity "music" associated with a set of attributes 124. In this example, the entities identified in entries 112, 114 are instances (ABC Pizza, Acme Football Team) and the entity identified in entry 116 is a category (music). The identifiers in entries 112, 114, 116 may be a name, a numeric or other identifier associated with the entity, a hash value, or the like.

Each attribute in the sets of attributes 120, 122, 124, may be a property, feature, or characteristic of the associated entity identified in entries 112, 114, 116, respectively. For example, the set of attributes 120 includes the entity attributes "location," "hours" and "menu" that are associated with the entity "ABC Pizza." The set of attributes 122 includes the entity attributes "stadium," "coaches," "roster" and "schedule" that are associated with the entity "Acme Football Team." The set of attributes 124 includes the entity attributes "style," "composer" and "instrument" that are associated with the entity "music."

Attributes 120, 122, 124 may have associated values that further define the entity with which they are associated. For example, the entity attribute "stadium" in the set of attributes 122 may be associated with the value "Acme Field." In addition, although not shown in FIG. 4, it shall be understood that entities may also be associated with other entities. For example, the entity "Acme Football Team" may be associated with entities "Acme Field," "National Football League," and entities associated with each of the players on the roster of the Acme Football Team.

Referring to FIGS. 1A and 1B, for example, the associations of entities and entity attributes are made available to information server system 40. For example, the entities, the entity attributes, and their associations may be stored in a data store, such as data store 50 as shown in FIGS. 1A and 1B. Data store 50 may include a very large amount of information about real-world interconnected entities and the attributes associated with those entities. Information server system 40 may communicate with data store 50 so as to access the data about the entities, the entity attributes, and their associations. The entity and attribute information may be used by validation module 44 to generate notifications about inferred intention of a user in accordance with aspects of the present disclosure.

To determine whether the inferred intention or action of the user is advisable, validation module 44 may refer to a set of rules associated with the intention and the one or more entities inferred from the context information. For example, for the intention, "call," the set of rules may include "check the current time vs. entity operating hours." The techniques of the present disclosure may include a list of "intentions" and a set of "rules" associated with the intention.

Figure 5:
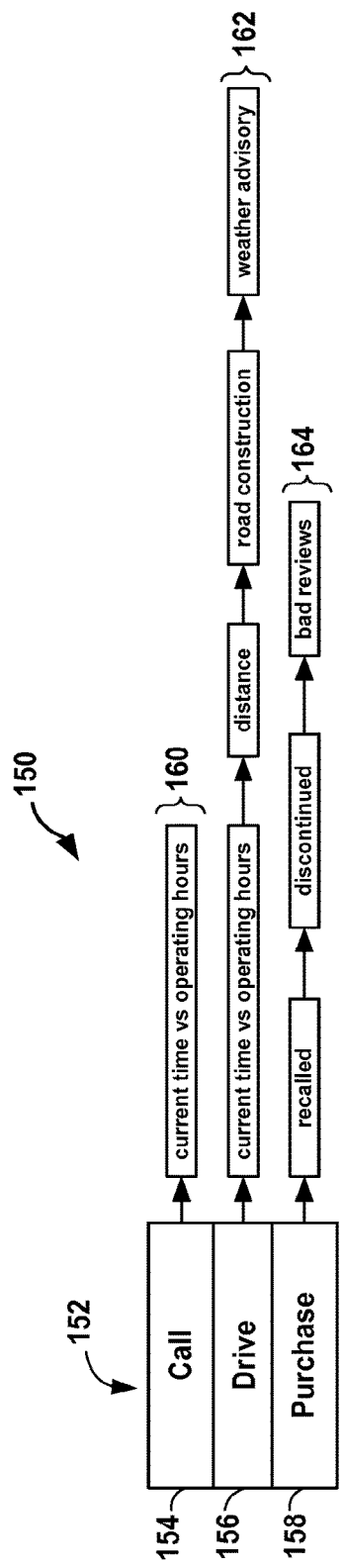
FIG. 5 is a conceptual diagram illustrating a list of intentions and sets of rules associated with the intentions.

FIG. 5 is a conceptual diagram 150 illustrating a list of defined intentions 152 and associated sets of rules 160, 162, and 164. Diagram 150 includes a list 152 that includes a collection of entries 154, 156, 158. Entries 154, 156, 158 each include an identifier of an intention and each intention is associated with a set of rules 160, 162, 164, respectively. In particular, entry 154 includes an identifier of the intention "Call" that is associated with the set of rules 160; entry 156 includes an identifier of the intention "Drive" that is associated with the set of rules 162; and entry 158 includes an identifier of the intention "Purchase" that is associated with a set of rules 164. The identifiers in entries 154, 156, 158 may be a name, a numeric or other identifier associated with the intention, a hash value, or the like. Although specific intentions are listed in FIG. 5, it shall be understood that other intentions of a user may also be included in the list of intentions 152, and that the disclosure is not limited in this respect.

Each set of rules 160, 162, 164, is associated with an intention 154, 156, 158, respectively, of data table 152. For example, the set of rules 160 includes the set of rules "current time vs operating hours" that is associated with the intention "Call" 154. The set of rules 162 includes the set of rules "current time vs operating hours," "distance," "road construction" and "weather advisory" that are associated with the intention "Drive" 156. The set of rules 164 includes the set of rules "recalled," "discontinued" and "bad reviews" that are associated with the intention "Purchase" 158.

Each rule in the set of rules 160, 162, 164 may have associated values or operations that further define how to determine whether or not the rule is met. For example, the rule "current time vs operating hours" in the set of rules 160 may include or refer to operations for automatically comparing the current time to an hours of operation attribute of an entity determined from the search query. As another example, the rule "recalled" in the set of rules 164 may include or refer to operations for automatically determining whether or not a product defined by an entity determined from the search query is subject to a current recall.

For example:

<intention>: Call

<rule>: compare current time vs. operating hours of <entity>.

<intention>: Drive

<rule>: compare current time vs. operating hours of <entity>;

<rule>: determine distance from current location to <entity>;

<rule>: determine if there is any road construction on a route from current location to <entity>;

<rule>: determine if there are any current weather advisories on a route from current location to <entity>.

<intention>: Purchase

<rule>: determine if there are any current recalls for <entity>;

<rule>: determine if <entity> has been discontinued;

<rule>: determine if there are a large number of bad reviews for <entity>.

In examples where the set of rules includes more than one rule, the system may analyze each rule to determine whether the rule is met. A separate notification may be generated for each rule that is met, or a single notification that includes information indicating that multiple rules are met. Alternatively, one or more rules in a set of rules may be given a higher priority than the remaining rules in the set of rules. For example, the rule comparing the current time versus the operating hours of the entity may be given a higher priority than the rule determining whether there are is any road construction on a route from the current location to the entity, because if a business is closed the user may not care whether there is any road construction along the route. In those examples, a notification may be displayed about the higher priority rule only, rather than all the rules in which the conditions are met.

The set of rules may also include rules for determining alternatives, such as whether or not to automatically search for alternatives to the inferred entity or intention. For example, a rule may include further instructions to automatically search for and display information concerning any alternatives in the event the originally inferred intention is not advisable. For the intention "Call," for example, the rule "compare time to current operating hours" may further include instructions to search for alternative entities of the same type, and to determine whether the user inferred intention may be accomplished with respect to any of the alternative entity or entities. In the example of FIG. 1A, for example, the rule "compare current time to operating hours of <ABC Pizza> may include further instructions to search for alternative entities to "ABC Pizza", and to evaluate the rule with respect to the hours of operation attribute for those alternative entities. Any notification data generated by validation module 44 may include the information concerning the alternatives, which may also be presented in the notifications on the user's computing device.

Figure 6:
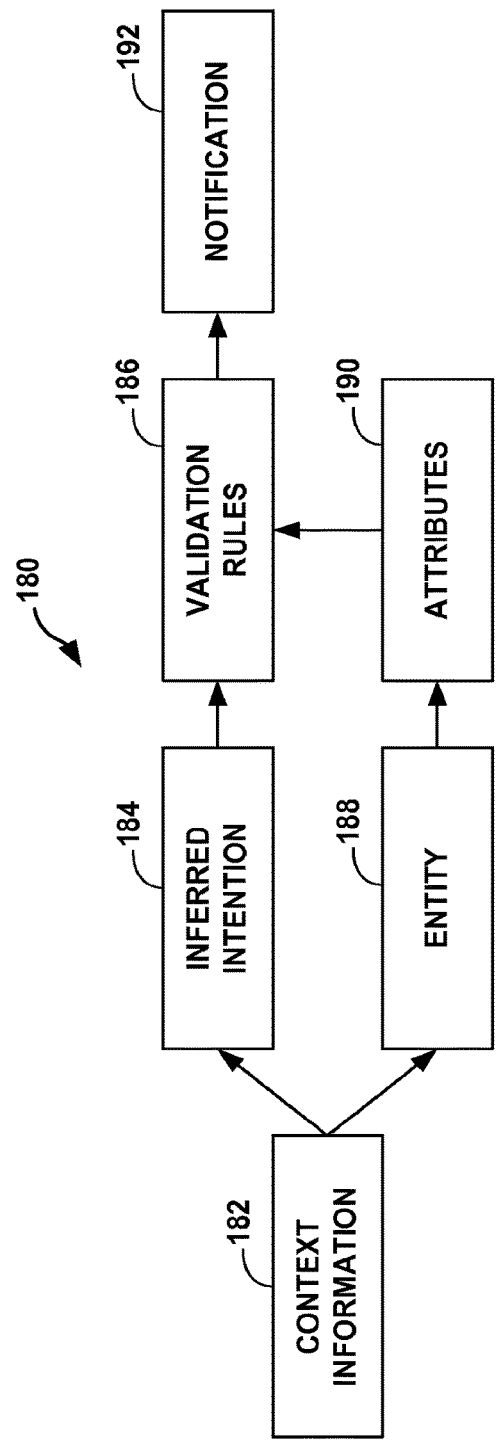
FIG. 6 is an conceptual diagram illustrating generation of notifications about inferred intention of a user in accordance with one or more aspects of the present disclosure.

FIG. 6 is a conceptual diagram 180 that illustrates generation of notifications about inferred intention of a user in accordance with one or more aspects of the present disclosure. A computing device, such as computing device 2 of FIGS. 1A and 1B, receives context information 182 associated with the computing device. The context information may be received from one or more sensors associated with the computing device. The sensors may include one or more motion sensors, location sensors, a user interface, a presence-sensitive display, microphones, cameras, biometric sensors, another computing device (such as a wearable computing device) or through any other mechanism by which a computing device may receive associated context information.

Based on context information 182, the inferred intention 184 of the user and the one or more entities 188 associated the inferred intention are determined. For example, inference module 42 may receive context information from computing device 2 and infer the intention of the user and an associated entity based on the context information. The intention may be inferred in any of a variety of ways. For example, if the context information is a search query, the intention may be inferred based on keywords of the search query. For search queries that have a sentence structure, natural language tools may be applied to the search query to extract the meaning of the sentence, and thus to extract the intention and the one or entities associated with the intention. The rankings of the search results may also be analyzed to determine intention. It shall be understood that although example mechanisms for inferring the intention of a user are described herein, other mechanisms may also be used and the disclosure is not limited in this respect.

As another example, if the context information is something other than a search query obtained from a sensor of a computing device, the intention may be inferred from the sensor data. For example, if the sensor is a motion sensor or a location sensor, the intention may be inferred based on the motion data or the location data, respectively. If the sensor is a biometric sensor, the intention may be inferred based on the biometric data. If the sensor is a camera, the intention may be inferred based on image data captured by the camera. If the sensor is a microphone, the intention may be inferred based on voice input or other auditory data captured by the microphone.

As another example, the intention of the user may be inferred from context information received from any combination of two or more sensors. For example, the search query "ABC pizza phone number" in combination with sensed travel in a direction toward an ABC Pizza location may result in a notification that the ABC Pizza location is closed. The notification may be presented at the time of the initial search query, such as shown in FIG. 1A, and/or the notification may be presented at a later time when the location sensors detect travel toward the ABC Pizza location.

The intention 184 is associated with a set of validation rules 186. The validation rules 186 may be applied against the attributes 190 of the entity 188 to determine whether the inferred intention is advisable. If the inferred intention of the user is not advisable, a notification 192 indicating the action is not advisable may be displayed on the user's computing device. In FIG. 1A, for example, the validation rule "compare current time to operating hours of <entity>" is applied against the attribute "hours" for entity "ABC Pizza." To apply the validation rule, the current time is compared against the hours of operation defined in the attribute "hours" for entity "ABC Pizza."

FIGS. 7A-7G are diagrams illustrating example notifications about inferred intention of a user as displayed on a user interface of a computing device in accordance with one or more aspects of the present disclosure. It shall be understood that example notifications shown in FIGS. 7A-7G are described herein for illustrative purposes only, and that the notifications of the present disclosure may include any combination of text, images, hyperlinks, or other visually displayable information. The notifications may further be accompanied by one or more sounds, vibrations, or other sensory outputs associated with the notification. In other examples, the notification may be a voice message output from a speaker or other auditory output device, or may include both visual and auditory forms of notification.

In the example of FIG. 7A, a user has input the search query "Baby ride car seat" into a search query box 212 of a user interface 210. The search results are displayed on a search results page 214 on user interface 210. The search results page 214 generally includes a listing of results returned by the application in response to the search query "Baby ride car seat." The search results may also include links to images, videos, news, maps, sponsored listings, or other content.

User interface 210 also includes a notification 216. In this example, notification 216 includes a banner containing the word "ALERT," the text "There is a product recall on the Consumer Co. "BabyRide" Infant Car Seat." The notification 216 also includes a link to further information regarding the recall may be obtained. In this example, the context information includes the search query, "Baby ride car seat." The inferred intention and the entity may be determined from the context information as follows:
  <intention>: Purchase
  <entity>: Consumer Co "BabyRide" Infant Car Seat A validation module, such as validation module 64 of FIG. 1A, may evaluate the advisability of purchasing the "Consumer Co "BabyRide" Infant Car Seat" using the example set of rules 164 associated with the intention "Purchase" as shown in FIG. 5. In this example, validation module determined that there is a current recall on the "Consumer Co "BabyRide" Infant Car Seat" and output notification data for display on user interface 210, such as by notification 216.

In the example of FIG. 7B, a user has input the search query "Lord of the Rings" into a search query box 222 of a user interface 220. The search results are displayed on a search results page 224 on user interface 220. The search results page 224 generally includes a listing of results returned by the application in response to the search query "Lord of the Rings." The search results may also include links to images, videos, news, maps, sponsored listings, or other content.

User interface 220 also includes a notification 226. In this example, notification 226 includes the text "You have this movie for free on MovieSite.com." The notification 226 also includes a link to a sign-in page of the website MovieSite.com.

In this example, the context information includes the search query, "Lord of the Rings." The inferred intention and the entity may be determined from the context information as follows:
  <intention>: Buy Movie
  <entity>: Movie: Lord of the Rings: The Fellowship of the Ring A validation module, such as validation module 64 of FIG. 1A, may evaluate the advisability of purchasing the movie "Lord of the Rings: The Fellowship of the Ring" using a set of rules associated with the intention "Buy Movie." Such rules may include, for example, searching for websites offering the movie "Lord of the Rings: The Fellowship of the Ring;" searching the user's online accounts to determine if they have already purchased the movie, etc. In this example, the validation module determined that the movie is available for free on the website MovieSite.com, and output notification data for display on user interface 220, such as by notification 226.

Figures 7C, 7D:
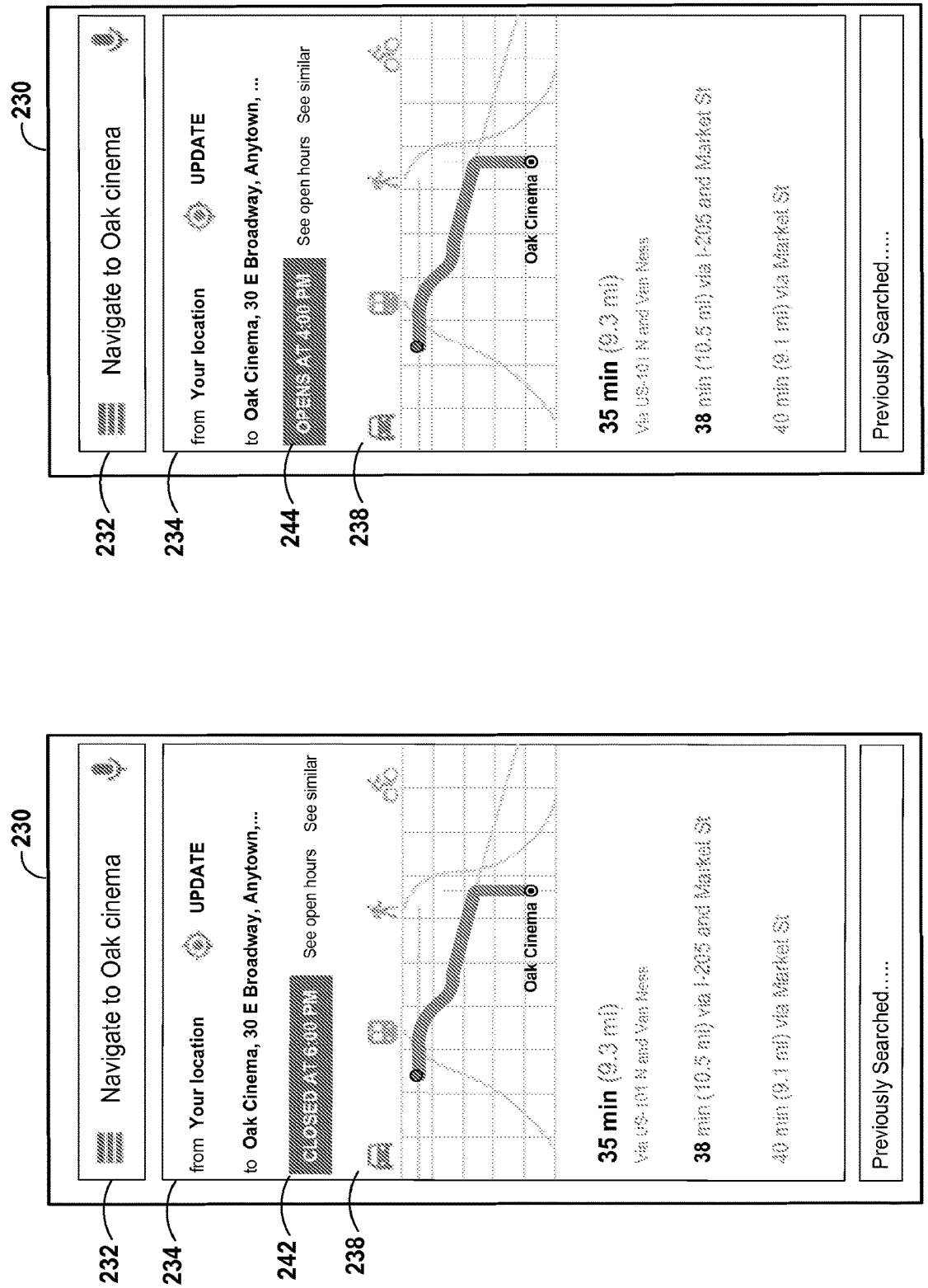

In the examples of FIG. 7C-7E, a user has input the search query "Navigate to Oak cinema" into a search query box 232 of a user interface 230. In this example, the computing device on which user interface 230 is displayed has opened a navigation or mapping application that displays mapping results 234 in response to the search query "Navigate to Oak cinema." Mapping results 234 includes an interactive map 238 with suggested routes to the location "Oak Cinema" from the user's current location.

In FIG. 7C, user interface 230 includes a notification 242 that includes the text "CLOSED AT 6:00 PM." In FIG. 7D, user interface 230 includes a notification 244 that includes the text "OPENS AT 4:00 PM." In FIG. 7E, user interface 230 includes a notification 246, that includes the text "CLOSING IN 30 MINUTES." The notifications 242, 244, 246 also include a link "See open hours" which permits the user to view the hours of operation of the entity, "Oak Cinema."

Example notifications 242, 246, 248 are alternative notifications that may be displayed based on the context information defined by the search query, "Navigate to Oak cinema."
  <intention>: Go to a Movie
  <entity>: Oak Cinema
  <rule>: compare current time with operating hours of <Oak Cinema>; and
    if the current time is after the closing time, output notification "CLOSED AT <closing time of Oak Cinema>";
    if the current time is before the opening time, output notification "OPENS AT <opening time of Oak Cinema>"; or
    if the current time is within <x> minutes of the closing time, output notification "CLOSING IN <closing time of Oak Cinema—current time> MINUTES"

As illustrated in FIGS. 7C-7E, the example rule associated with the intention "Go to Movie" may result in different notifications being displayed depending on the current time. It shall be understood, however, that this is one example of alternative notifications, and that rules may include other types of alternatives based on other additional information, and that the disclosure is not limited in this respect. In addition, the additional information such as "See open hours," "Suggest similar," and/or a list of alternative businesses (such as other nearby movie theaters) may also be displayed in notifications of FIGS. 7C-7E.

In the example of FIG. 7F, a user interface 260 of a computing device displays an example home screen 260. Example home screen 260 includes a clock and icons through which a user may invoke phone, calendar, messaging, and web browser applications. Oftentimes, a user may repeat past behavior from which a computing device, such as computing device 2 as shown in FIG. 1A, may infer an intention or action of a user. Repetition of past behavior may be analyzed as the context information for purposes of the present disclosure. For example, an inference module, such as inference module 62 of FIG. 1, may recognize repeated actions that a user performs on their computing device, such as commonly visited locations, repeated calendar appointments, search queries, etc. This context information may then be analyzed to infer an intention of the user and to display notifications about the inferred intention on the user's computing device.

In FIG. 7F, for example, a location sensor, such as GPS application running on a user's computing device, has detected that the computing device is travelling on a route that has been repeated every Thursday morning for the last 5 weeks from their home to the coffee shop, "House of Java." From this context information, an inference module, such as inference module 62 of FIG. 1A, may determine that the inferred intention of the user is to drive to the coffee shop, House of Java. For example:

<intention>: Drive
<entity>: House of Java

A validation module, such as validation module 64 of FIG. 1A, may evaluate the advisability of driving to the location "House of Java" using a set of rules associated with the intention "Drive." For example, the set of rules may include the set of rules 162 as shown in FIG. 5. In the example of FIG. 7F, the validation module has determined that the "House of Java" is closed today, and has output notification data for display on home page 262, and the notification data is displayed as notification 264. Notification 264 includes the text "Headed to: House of Java, 620 East 21$^{st}$ Street, Anytown, United States." This portion of the notification informs the user of the computing device that the current route has been recognized and that the intention to drive to the repeated location, "House of Java," has been inferred. Notification 264 further includes the text "CLOSED TODAY" along with the information "Reopens tomorrow at 6:00 AM."

Figure 7G:
Figure 7G:
Figure 7G:
Figure 7G:
Figure 7G:

In FIG. 7G, a location sensor, such as GPS application running on a user's computing device, has detected the computing device travelling on the repeated route described above with respect to FIG. 7F. As in that example, an inference module, such as inference module 62 of FIG. 1A, has determined that the inferred intention of the user is to drive to the coffee shop, "House of Java," and a validation module, such as validation module 64 of FIG. 1A, has determined that the action is not advisable. A notification 274 is displayed on the home screen 270 of the user's computing device indicating the inferred intention to drive to the coffee shop, "House of Java," is not advisable. In addition, the validation module has automatically identified an alternative entity, "Coffee Palace." The validation module has further determined, based on stored attribute information associated with the alternative entity, "Coffee Palace," and based on the stored set of rules associated with the inferred intention, "Drive," that the inferred intention is advisable with respect to the alternative entity. In this example, the validation module compares the current time to an hours of operation attribute associated with the alternative entity, "Coffee Palace." The computing system outputs, for display on the computing device, notification data indicating that the inferred intention is advisable with respect to the alternative entity. In this example, the notification 274 includes the alternative information "Nearby: Coffee Palace is Open" and a link "Click for more info . . . " that allows the user to obtain further information concerning the entity "Coffee Palace" if that information is of interest to them.

Figure 8:
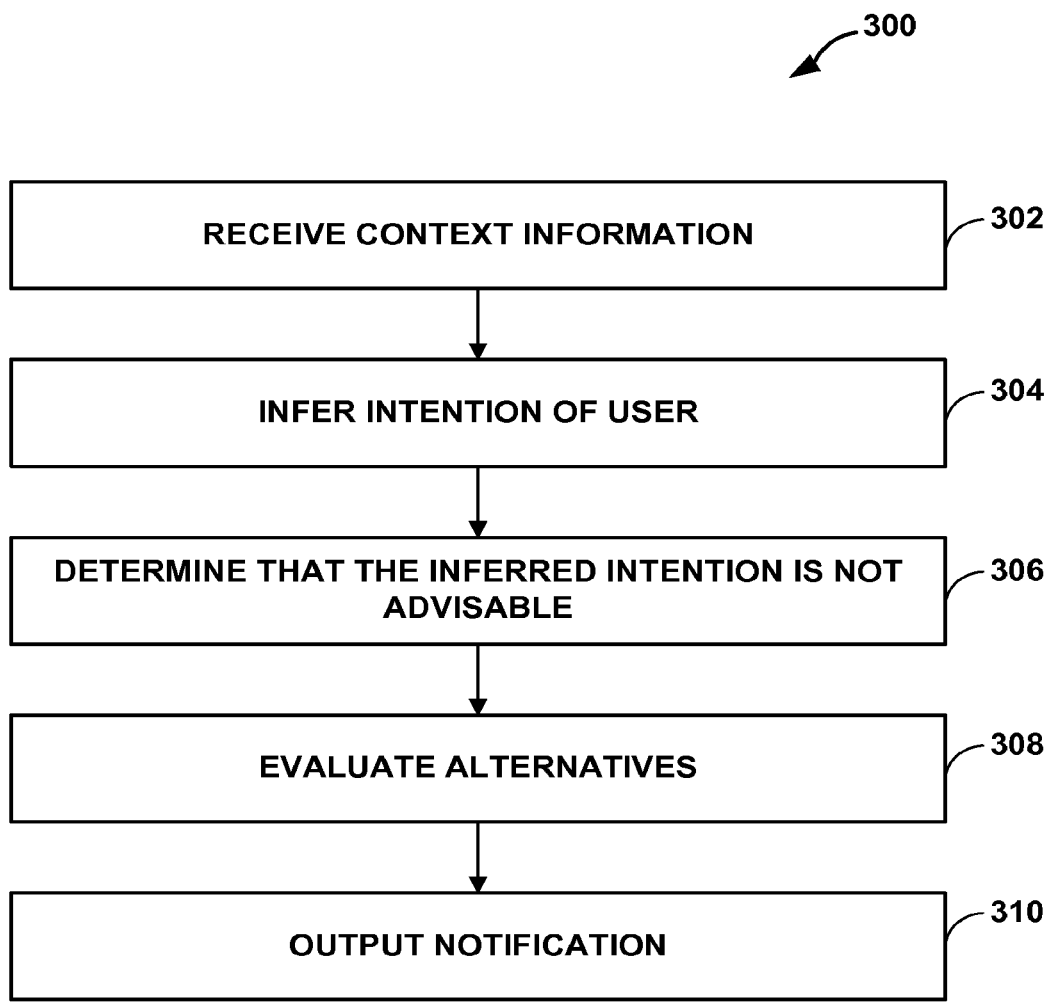
FIG. 8 is a flow diagram illustrating an example process by which a computing device generates notifications about an inferred intention of a user.

FIG. 8 is a flow diagram illustrating an example process (300) by which a computing system generates notifications about an inferred intention of a user. The computing system may include, for example, information server system 40 as shown in FIG. 1A. The computing system receives context information associated with a computing device. The computing device may be, for example, a computing device associated with a user, such as computing device 2 as shown in FIG. 1A.

The context information may be detected by one or more sensors associated with the computing device. The sensors may include, for example, one or more motion sensors, location sensors, a user interface, a presence-sensitive display, microphones, cameras, biometric sensors, or any other mechanism by which a computing device may receive associated context information. The sensors may include, for example, user interface device 4 and/or any of sensors 8 of FIG. 1A.

The context information may include, for example, The context information may include, for example, location data associated with the computing device, motion data associated with the computing device, a biometric parameter associated with a user of the computing device, weather data, image data, or a sound. As another example, the context information may include information input into computing device 2 with respect to a request or query, such as a search query, a navigation query, or other online interaction of the user. The context information may also include information associated with interactions with one or more applications of computing device 2, such as calendar applications, alarm applications, mapping applications, camera applications, or any other application interactions. The context information may also include repeated actions that a user performs on the computing device or sensed by the computing device (e.g., common locations, repeated calendar appointments, repeated search queries, etc.).

The computing system infers, based on the context information, an intention of a user of the computing device (304). The inferred intention may be associated with at least one entity. The inferred intention may include an inferred (i.e., predicted) action to be taken by the user. To that end, the inferred intention may include, for example, placing a telephone call to a place of business, navigating (e.g., driving) to a place of business, purchasing a product, repeating a past behavior, or other action of the user that may be inferred from the context information.

The computing system determines, based on stored attribute information associated with the at least one entity, and based on a stored set of rules associated with the inferred intention, whether the inferred intention is advisable (306). In some examples, the computing system determines that the inferred intention is not advisable. The set of rules may include one or more rules by which the advisability of the inferred intention may be evaluated with respect to the at least one entity. For example, if the inferred intention of the user is to place a telephone call or drive to a place of business, the set of rules may include the rule, "compare current time with operating hours of the place of business."

Responsive to determining that the inferred intention is not advisable, the computing system may optionally evaluate any alternative entities to determine whether the inferred intention may be accomplished with respect to the alternative entity or entities (308). For example, the computing system may automatically identify an alternative entity, determine, based on stored attribute information associated with the alternative entity and based on the stored set of rules associated with the inferred intention, that the inferred intention is advisable with respect to the alternative entity, and output, for display on the computing device, notification data indicating that the inferred intention is advisable with respect to the alternative entity.

Alternatively or in addition, responsive to determining that the inferred intention is not advisable, the computing system may optionally output, for display on the computing device, notification data including an option to search for an alternative entity for which the inferred intention is advisable.

Responsive to determining that the inferred intention is not advisable (and optionally evaluating any alternatives), the computing system outputs, for display on the computing device, notification data indicating that the inferred intention is not advisable (310). For example, if the inferred intention of the user is to place a telephone call or drive to a place of business, the closing time of the place of business is 5:00 PM, and the current time is 6:35 PM, the computing system may output notification data to be displayed on the computing device as, for example, "CLOSED AT 5:00 PM."

Optionally, the notification data to be displayed may further include information concerning any alternatives, such as a similar type of business that is currently open, and a link or other mechanism for obtaining further information concerning the alternative. In the aforementioned example, if an alternative (i.e., similar type) of business is open until 7:00 PM, the computing system may output notification data to be displayed on the computing device as, for example, "<Name of Business> is open until 7:00 PM" along with a link or other mechanism for obtaining further information concerning the alternative business or entity.

Example 1: A method comprising receiving, by a computing system, context information associated with a computing device; inferring, by the computing system and based on the context information, an action of a user of the computing device, the action associated with an entity; determining, by the computing system and based on stored attribute information associated with the entity, and based on a stored set of rules associated with the inferred action, that the inferred action is not advisable; and responsive to determining that the action is not advisable, outputting, by the computing system and for display on the computing device, notification data indicating that the inferred action is not advisable.

Example 2: The method of claim 1, wherein the inferred action is one of a plurality of stored actions, and wherein each of the plurality of stored actions is associated with a different stored set of rules.

Example 3: The method of any combination of examples 1-2, wherein each rule in the stored set of rules defines an operation by which advisability of the inferred action may be evaluated with respect to the stored attribute information.

Example 4: The method of any combination of examples 1-3, wherein the stored set of rules includes comparing a current time with an hours of operation attribute associated with the entity.

Example 5: The method of any combination of examples 1-4, wherein the context information comprises at least one of location data associated with the computing device, a motion of the user, a biometric parameter associated with the user, weather data, an online interaction associated with the user, an image, a sound, a search query, and a navigation query.

Example 6: The method of any combination of examples 1-5, wherein the context information is based on information received from an application of the computing device.

Example 7: The method of any combination of examples 1-6, wherein the entity comprises a place of business, and determining that the inferred action is not advisable comprises comparing a current time to an hours of operation attribute associated with the entity.

Example 8: The method of any combination of examples 1-7, wherein the entity comprises a place of business, the inferred action of the user is to place a telephone call to the place of business, and the notification indicates that the place of business is not currently open for business.

Example 9: The method of any combination of examples 1-8, wherein the entity comprises a place of business, the inferred action of the user is to navigate to the place of business, and the notification indicates that the place of business is not currently open for business.

Example 10: The method of any combination of examples 1-9, wherein receiving context information comprises receiving, by the computing system, a search query, and inferring the action of the user comprises inferring, by the computing system and based on one or more terms of the search query, the action of the user.

Example 11. A computing system comprising one or more processors; and at least one module executable by the one or more processors to perform the method of any combination of examples 1-10.

Example 12. A computing system comprising means for performing the method of any combination of examples 1-10.

Example 13. A non-transitory computer-readable storage medium storing instructions that, when executed, cause one or more processors of a computing device to perform the method of any combination of examples 1-10.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method implemented by one or more processors, the method comprising:
   receiving a search query directed to a navigation application executing on a computing device, the search query including data specifying a place of business as an entity;
   in response to receiving the search query directed to the navigation application executing on the computing device:
      determining, based on the search query, an inferred intention of a user of the computing device, the inferred intention being selected from a plurality of defined intentions; and
      determining, based on one or more stored attributes associated with the entity, whether the inferred intention is advisable with respect to the entity;
   detecting sensor data indicating sensed travel towards the entity; and
   in response to determining that the inferred intention is not advisable with respect to the entity, and in response to detecting the sensed travel towards the entity:
      determining a given alternative entity that is different from the entity, wherein determining the given alternative entity is based on the given alternative entity being an additional place of business that is of a same type as the entity, and wherein the given alternative entity is one of a plurality of alternative entities capable of satisfying the inferred intention;
      determining, based on one or more additional stored attributes associated with the given alternative entity, whether the inferred intention is advisable with respect to the given alternative entity; and
      in response to determining that the inferred intention is advisable with respect to the given alternative entity:
         simultaneously outputting, for display at the computing device, and as part of a single notification while the user is travelling towards the entity:
            first notification data that indicates the inferred intention is not advisable with respect to the entity, and
            second notification data that indicates the inferred intention is advisable with respect to the given alternative entity, and that includes a selectable link that, upon selection, allows the user to obtain information about the given alternative entity.

2. The method of claim 1, wherein the first notification data indicates that the place of business is not currently open for business.

3. The method of claim 2, wherein the sensor data indicating the sensed travel towards the entity is based on navigational data corresponding to movement of the computing device, wherein the inferred intention of the user is to travel to the place of business, wherein the one or more stored attributes associated with the entity include an hours of operation attribute associated with the place of business, and wherein determining that the inferred intention is not advisable comprises:
   determining, based on comparing a current time with the hours of operation attribute associated with the place of business, that the place of business is not currently open for business.

4. The method of claim 3, wherein the second notification data indicates that the additional place of business is currently open for business.

5. The method of claim 4, wherein the one or more additional stored attributes associated with the given alternative entity include an additional hours of operation attribute associated with the additional place of business, and wherein determining the given alternative entity that is different from the entity comprises:
   determining, based on comparing the current time with the additional hours of operation attribute associated with the additional place of business, that the additional place of business is currently open for business.

6. The method of claim 5, wherein determining the given alternative entity that is different from the entity further comprises:
   automatically submitting, to a search engine, an additional search query for the plurality of alternative entities that are of the same type as the entity, wherein the additional search query submitted to the search engine is a query re-write.

7. The method of claim 5, wherein determining the given alternative entity that is different from the entity further comprises:
   automatically submitting, to a search engine, an additional search query for the plurality of alternative entities that are of the same type as the entity, wherein the additional search query submitted to the search engine is a query for places of business of the same type as the entity.

8. The method of claim 7, further comprising:
   determining, based on one or more rules stores in association with the entity, the query for places of business of the same type as the entity should be submitted to the search engine in response to determining that the inferred intention is not advisable with respect to the entity; and
   wherein automatically submitting the additional search query is in response to determining, based on one or more of the rules, that the query should be submitted to the search engine.

9. The method of claim 1, wherein the second notification data further includes an additional selectable link that, upon selection, allows the user to view additional alternative entities of the plurality of alternative entities.

10. A computing system, comprising:
    one or more processors;
    a computer-readable storage medium configured to store instructions that, when executed, cause the one or more processors to:
       receive a search query directed to a navigation application executing on a computing device, the search query including data specifying a place of business as an entity;

in response to receiving the search query directed to the navigation application executing on the computing device:
  determine, based on the search query, an inferred intention of a user of the computing device, the inferred intention being selected from a plurality of defined intentions; and
  determine, based on one or more stored attributes associated with the entity, whether the inferred intention is advisable with respect to the entity;
detect sensor data indicating sensed travel towards the entity; and
in response to determining that the inferred intention is not advisable with respect to the entity, and in response to detecting the sensed travel towards the entity:
  determine a given alternative entity that is different from the entity, wherein determining the given alternative entity is based on the given alternative entity being an additional place of business that is of a same type as the entity, and wherein the given alternative entity is one of a plurality of alternative entities capable of satisfying the inferred intention;
  determine, based on one or more additional stored attributes associated with the given alternative entity, whether the inferred intention is advisable with respect to the given alternative entity; and
  in response to determining that the inferred intention is advisable with respect to the given alternative entity:
    simultaneously output, for display at the computing device and as part of a single notification while the user is travelling towards the entity:
      first notification data that indicates the inferred intention is not advisable with respect to the entity, and
      second notification data that indicates the inferred intention is advisable with respect to the given alternative entity, and that includes a selectable link that, upon selection, allows the user to obtain information about the given alternative entity.

11. The system of claim 10, wherein the instructions to determine the given alternative entity that is different from the entity further cause the one or more processors to:
  automatically submit, to a search engine, an additional search query for the plurality of alternative entities that are of the same type as the entity, wherein the additional search query submitted to the search engine is a query re-write.

12. The system of claim 10, wherein the instructions to determine the given alternative entity that is different from the entity further cause the one or more processors to:
  automatically submit, to a search engine, an additional search query for the plurality of alternative entities that are of the same type as the entity, wherein the additional search query submitted to the search engine is a query for places of business of the same type as the entity.

13. The system of claim 12, further comprising instructions that cause the at least one processor to:
  determine, based on one or more rules stores in association with the entity, the query for places of business of the same type as the entity should be submitted to the search engine in response to determining that the inferred intention is not advisable with respect to the entity; and
  wherein the instructions to automatically submit the additional search query are executed is in response to determining, based on one or more of the rules, that the query should be submitted to the search engine.

14. The system of claim 10, wherein the sensor data indicating the sensed travel towards the entity is based on navigational data corresponding to movement of the computing device, wherein the inferred intention of the user is to travel to the place of business, wherein the one or more stored attributes associated with the entity include an hours of operation attribute associated with the place of business, and wherein the instructions to determine that the inferred intention is not advisable cause the at least one processor to:
  determine, based on comparing a current time with the hours of operation attribute associated with the place of business, that the place of business is not currently open for business;
  wherein the first notification data further indicates that the place of business not currently open for business.

15. The system of claim 14, wherein the one or more additional stored attributes associated with the given alternative entity include an additional hours of operation attribute associated with the additional place of business, and wherein the instructions to determine the given alternative entity that is different from the entity cause the at least one processor to:
  determine, based on comparing the current time with the additional hours of operation attribute associated with the additional place of business, that the additional place of business is currently open for business;
  wherein the second notification data further indicates that the additional place of business is currently open for business.

16. A non-transitory computer-readable storage medium storing instructions that, when executed, cause at least one processor of a computing system to:
  receiving a search query directed to a navigation application executing on a computing device, the search query including data specifying a place of business as an entity;
  in response to receiving the search query directed to the navigation application executing on the computing device:
    determine, based on the search query, an inferred intention of a user of the computing device, the inferred intention being selected from a plurality of defined intentions; and
    determine, based on one or more stored attributes associated with the entity, whether the inferred intention is advisable with respect to the entity;
  detect sensor data indicating sensed travel towards the entity; and
  in response to determining that the inferred intention is not advisable with respect to the entity, and in response to detecting the sensed travel towards the entity:
    determine a given alternative entity that is different from the entity, wherein determining the given alternative entity is based on the given alternative entity being an additional place of business that is of a same type as the entity, and wherein the given alternative entity is one of a plurality of alternative entities capable of satisfying the inferred intention;
    determine, based on one or more additional stored attributes associated with the given alternative entity, whether the inferred intention is advisable with respect to the given alternative entity; and in response to determining that the inferred intention is advisable with respect to the given alternative entity:
simultaneously output, for display at the computing device, and as part of a single notification while the user is travelling towards the entity:
first notification data that indicates the inferred intention is not advisable with respect to the entity, and
second notification data that indicates the inferred intention is advisable with respect to the given alternative entity, and that includes a selectable link that, upon selection, allows the user to obtain information about the given alternative entity.

\* \* \* \* \*